United States Patent
Gao et al.

(10) Patent No.: US 8,573,377 B2
(45) Date of Patent: Nov. 5, 2013

(54) BUILT-IN PARKING LOCKING DEVICE OF VEHICLE

(75) Inventors: Yong Gao, Chongqing (CN); Xianjun Ouyang, Chongqing (CN); Xiaobing Zheng, Chongqing (CN)

(73) Assignee: Loncin Motor Co., Ltd., Chongqing (CN)

( * ) Notice: Subject to any disclaimer, the term of this patent is extended or adjusted under 35 U.S.C. 154(b) by 484 days.

(21) Appl. No.: 12/867,753

(22) PCT Filed: Sep. 17, 2008

(86) PCT No.: PCT/CN2008/072388
§ 371 (c)(1),
(2), (4) Date: Nov. 22, 2010

(87) PCT Pub. No.: WO2009/100635
PCT Pub. Date: Aug. 20, 2009

(65) Prior Publication Data
US 2011/0056794 A1    Mar. 10, 2011

(30) Foreign Application Priority Data

Feb. 14, 2008    (CN) .......................... 2008 1 0069363

(51) Int. Cl.
*F16H 63/34*    (2006.01)
(52) U.S. Cl.
USPC ..................................... 192/219.4; 74/411.5
(58) Field of Classification Search
USPC ......... 192/219, 219.1, 219.4, 219.5; 74/411.5
See application file for complete search history.

(56) References Cited

U.S. PATENT DOCUMENTS

| | | | | |
|---|---|---|---|---|
| 1,907,574 | A * | 5/1933 | Plotkin ...................... | 192/219.1 |
| 4,662,489 | A * | 5/1987 | Honekamp et al. ........ | 192/219.4 |
| 5,651,435 | A * | 7/1997 | Perosky et al. ............. | 192/219 |
| 6,868,952 | B2 * | 3/2005 | Burger ........................ | 192/219.4 |
| 7,140,483 | B2 * | 11/2006 | Kramer et al. ............. | 192/219.4 |
| 7,152,723 | B2 | 12/2006 | Yamamoto | |

FOREIGN PATENT DOCUMENTS

| | | |
|---|---|---|
| CN | 1483926 A | 3/2004 |
| CN | 2675964 Y | 2/2005 |
| CN | 2690205 Y | 6/2005 |
| CN | 1763403 A | 4/2006 |
| CN | 2856600 Y | 1/2007 |

* cited by examiner

*Primary Examiner* — David D Le
*Assistant Examiner* — Jacob S Scott
(74) *Attorney, Agent, or Firm* — Hultquist, PLLC; Steven J. Hultquist

(57) ABSTRACT

A built-in parking locking device of vehicle comprises a lock base (2) which is fixed on a box body (12) which supports a transmission rotating shaft (8) and a lock core (6) which is matched on the transmission rotating shaft (8) with a spline and can move axially pulled by a pulling fork (9). The lock base is provided with a lock pin (3); the lock core is provided with a positioning hole (6*a*) used for circumferential positioning; the rotating shaft passes through the circle center hole of the lock base and is supported on the box body; after the lock core moves towards the lock base direction, the positioning hole (6*a*) used for the circumferential positioning and the lock pin (3) on the lock base are matched so as to form circumferential fixing; the pulling fork (9) is connected with a gear shifting cam (11).

17 Claims, 2 Drawing Sheets

BUILT-IN PARKING LOCKING DEVICE OF VEHICLE

FIELD OF THE INVENTION

The present invention relates to a parking device for vehicle, and particularly, to a built-in parking locking device of vehicle.

BACKGROUND ART

The brake device of vehicles comprising automobiles, four-wheel motorbikes and three-wheel motorbikes during parking is usually an external parking braking device, which brakes the vehicles using a braking device disposed at the wheels during parking, that is, after a vehicle has been stopped stably, a brake control lever is pulled and a guy cable is controlled to bring the braking device disposed at the wheels to work, thereby restricting the rotation of the wheels and realizing parking and braking. Since the external parking braking device which uses the braking device to realize parking and braking must rely on the friction generated by the braking device of the wheels to realize braking, and after the friction plate of the braking device has been abraded due to long-term use, a braking gap will become larger and larger and the friction will thus change so that the braking will be unstable, and sometimes even a braking feint will appear, that is, after the stopping the vehicle the driver pulls the brake control lever and feels that braking has been achieved, while actually the friction is very small due to the abrasion of the friction plate, which may result in a braking feint, and the vehicle may be made to slide once an external force such as vibration and crashing is applied, especially when the vehicle parks on a slope. The sliding after the parking due to the braking feint of the vehicle is very dangerous, and accidents of vehicle crash and casualties repeatedly appear. Thus, how to solve the problem of braking feint during parking and improve the safety and stability of parking have always puzzled the vehicle manufacturing industry.

SUMMARY OF THE INVENTION

In view of the shortcoming in the prior art, the present invention aims at providing a built-in parking braking device of a vehicle which can ensure the reliability and the stability of the parking and braking of the vehicle, which can eliminate the braking feint and ensure the safety and the reliability of the parking.

The object of the present invention is realized as follows: the parking locking device comprises: a lock base which is fixed on a box body which supports a transmission rotating shaft and a lock core which is matched on the transmission rotating shaft with a spline and can move axially pulled by a pulling fork, and the lock base is provided with lock pins, the lock core is provided with positioning holes for circumferential positioning, the rotating shaft passes through the circle center hole in the lock base and is supported on the box body; after the lock core moves towards direction of the lock base, the positioning holes of the lock core for the circumferential positioning and the lock pins on the lock base are matched so as to form circumferential fixing, and the pulling fork is connected with a gear shifting cam.

Due to the use of the above technical solution, a lock base is provided on the box body which supports the transmission rotating shaft and is provided with lock pins; a lock core is matched on the transmission rotating shaft with a spline and can move axially pulled by a pulling fork, the lock core is provided with positioning holes for circumferential positioning, and the pulling fork is connected with a gear shifting cam. During driving a vehicle, the lock core is separated from the lock base and the transmission can work normally. When the vehicle stops driving and is being parked, the driver just needs to pull a control device for gear shifting to a parking gear position, and the gear shifting cam of the control device can make the pulling fork to pull the lock core of the locking device so that it moves towards the lock base direction and engages with the lock base, the lock pins on the lock base insert into the positioning holes in the lock core for circumferential positioning to circumferentially fix the lock core, and as the lock core and the rotating shaft spline are matched, after the lock core has been circumferentially fixed, the rotating shaft is also fixed circumferentially so that the rotating shaft cannot rotate, thereby locking the transmission. Once the transmission has been locked, the wheels that are connected with the shaft of the transmission via a teeth transmission mechanism cannot rotate, either, thereby realizing parking and braking of the vehicle and stably parking the vehicle. Such a pin-type locking will not loose once it is formed and will not incur feint braking due to the abrasion of the friction plate, and then the prior phenomenon of feint braking of parking and braking via the braking device is eliminated and thoroughly solves the problem of unstable parking.

As this parking locking device brakes the rotating shaft of the transmission, it is only necessary to fix the lock base on the box body where the transmission is mounted and to match a lock core with a spline at one rotating shaft of the transmission, and the structure is very simple, and it is not necessary to change the structure and the layout of the vehicle in a large scale, which helps implementation and does not need a large cost.

To make the parking locking device easily form locking, elastic lock pins are selected for the lock pins which pin heads are provided with conical faces, and when the vehicle is parked, if the positioning holes of the lock core just face the lock pins, the lock pins directly insert into the positioning holes to form parking locking which restricts the rotation of the lock core, and if the positioning holes of the lock core do not face the lock pins, the lock pins will be pressed back into the lock base when the lock core gets close, and at this time the vehicle has not been parked stably, with the slight sliding backward or forward of the vehicle, the lock core will rotate to a position where the positioning holes face the lock pins, and the lock pins insert into the positioning holes of the lock core under the tension of the spring to form parking locking, so that the vehicle stops sliding and is parked on the road stably. During cancelling the parking locking, the driver just needs to pull the control device for gear shifting to a neutral gear position, and the gear shifting cam controlled by the control device is separated from the lock base via the pulling fork which pulls the lock core of the parking locking device, thereby cancelling the parking locking, and the transmission can restore normal work.

The present invention will be further described in conjunction with accompanying drawings and embodiments.

BRIEF DESCRIPTION OF THE ACCOMPANYING DRAWINGS

In the accompanying drawings, 1 refers to lock housing, 2 refers to lock base, 2a refers to circle center hole, 3 refers to lock pin, 4 refers to compression spring, 5 refers to bolt, 6 refers to lock core, 6a refers to positioning hole, 6b refers to circular groove, 6c refers to flange, 7 refers to gear, 8 refers to auxiliary shaft, 9 refers to pulling fork, 10 refers to pulling fork shaft, 11 refers to gear shifting cam, and 12 refers to crankcase body.

DETAILED DESCRIPTION OF THE INVENTION

Figure 1:
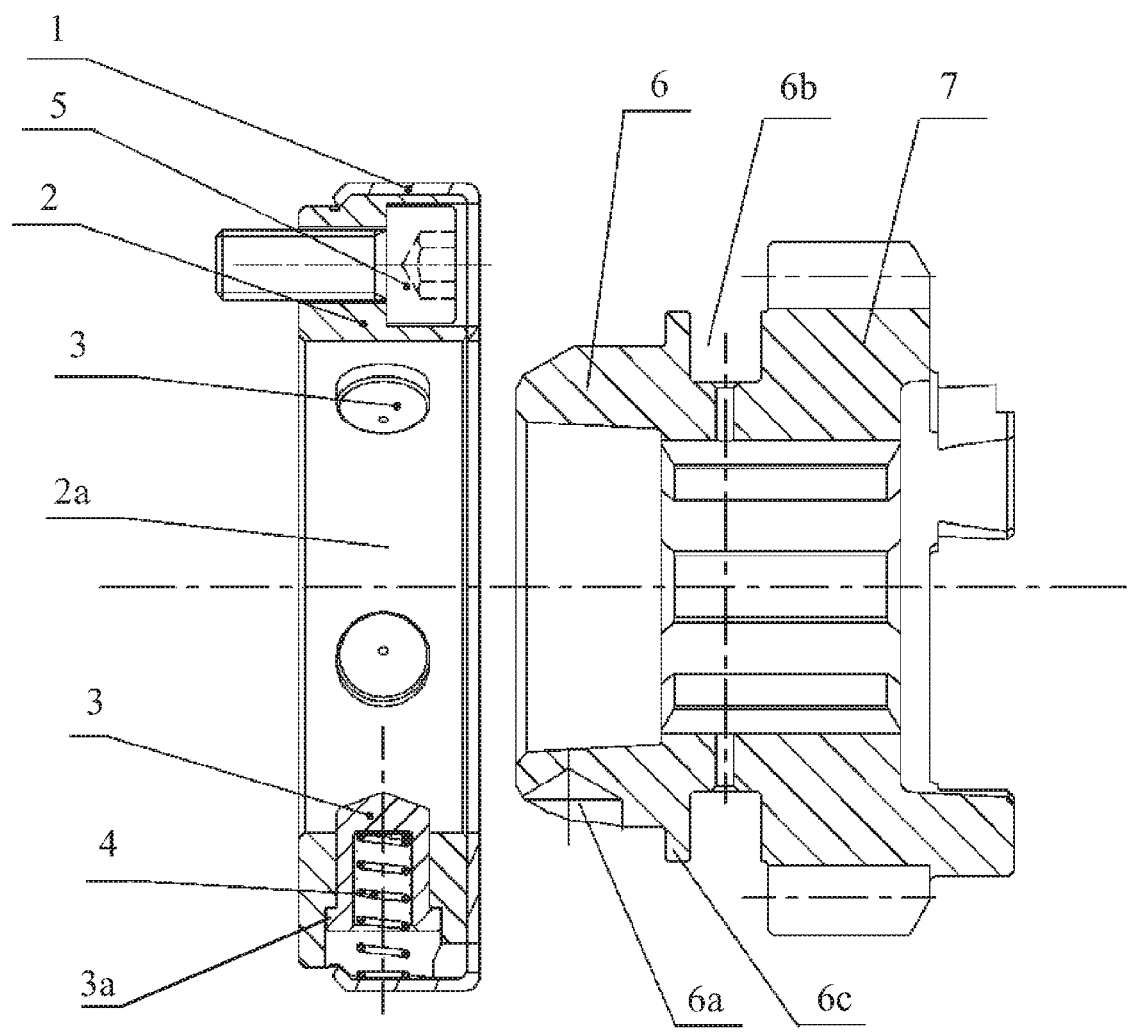
FIG. 1 is a schematic view of the structure of the present invention.
Figure 2:
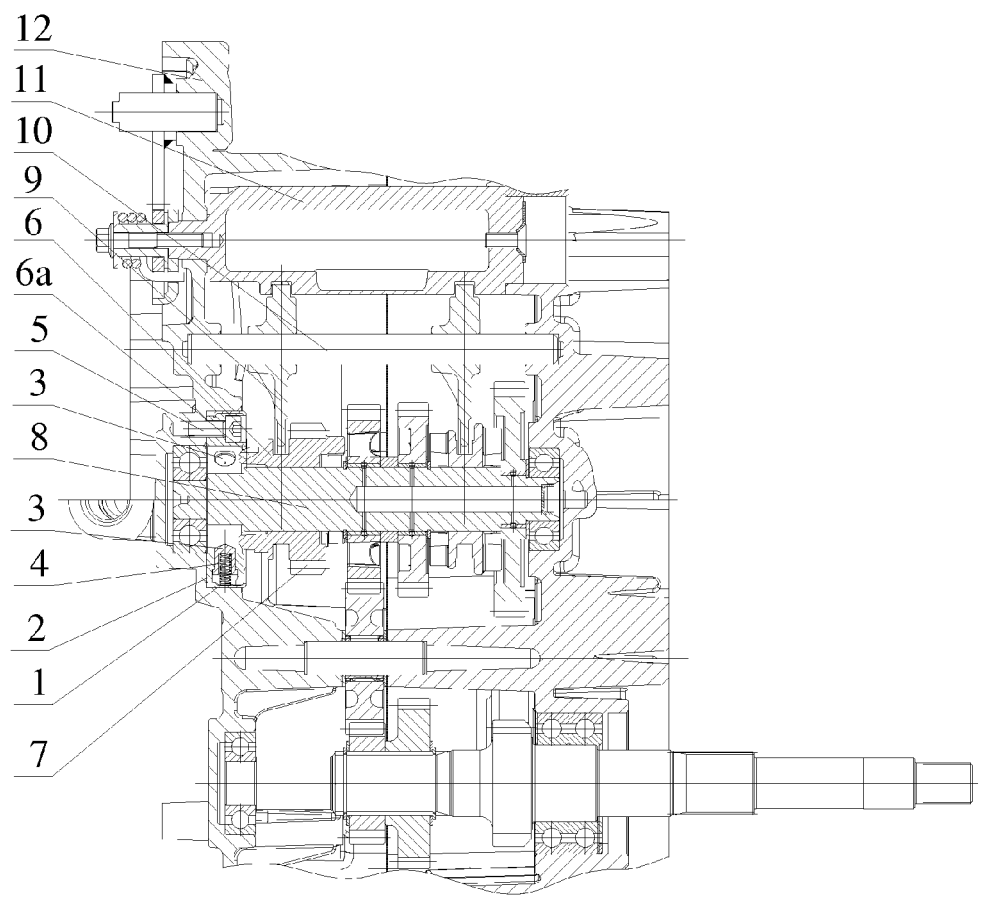
FIG. 2 is a schematic view of the present invention when assembled at the transmission in the crankcase of a motorbike engine.

Referring to FIGS. 1 and 2, the embodiments of built-in parking locking devices of a three-wheel motorbike engine and a four-wheel motorbike engine are illustrated, and the parking locking device comprises a lock base 2 fixed on a crankcase body 12 which supports a transmission auxiliary shaft 8 and a lock core 6 which is matched on the transmission auxiliary shaft 8 with a spline and can move axially pulled by a pulling fork 9, and in this embodiment the lock core 6 is provided at an axial end of a gear 7 and forms an integral structure with the gear 7. The lock base 2 is fixed using a bolt 5 in a counter bore in the crankcase body 12 for mounting a bearing so that it cannot rotate, or tightening key fixing can also be used to achieve the same effect. The lock base 2 is provided with lock pins 3 which are provided in a number of 5, and 5 lock pins 3 are disposed evenly surrounding a circle center hole 2a of the lock base 2, and the auxiliary shaft 8 passes through the circle center hole 2a in the lock base 2 and is supported on the crankcase body 12. The lock pins 3 according to the embodiment are radially provided on the lock base 2 and extend out of the wall of the circle center hole 2a of the lock base 2 at one ends thereof, and a space for the insertion of the lock core 6 is reserved between the wall of the circle center hole 2a and the auxiliary shaft 8 so that the lock pins 3 can fix the lock core 6 from the circumference of the lock core 6. The lock pins 3 are elastic lock pins with pin heads being provided with conical faces, and are matched in ladder holes which are provided in the lock base 2 for assembling the lock pins with clearance therebetween, a flange 6c of the lock core proximal to the ends of the lock pins 3 is restricted at a hole shoulder to restrict falling of the lock pins 3 off the holes, and a compression spring 4 is provided in the holes to abut against the ends of the lock pins 3 so that the pin heads extend out of the wall of the circle center hole of the lock base 2. To conveniently mount the lock base 2 within the counter bore in the crankcase body 12, the lock base 2 is provided with a lock housing 1 to cover the circumference of the lock base to stop the compression spring 4 in the ladder holes, so that the compression spring 4 can apply a certain pre-pressure to the lock pins 3. The lock core 6 is provided with positioning holes 6a for circumferential positioning which are provided in a number of 5, and the 5 positioning holes 6a are evenly provided in the lock core 6 opposite to the lock pins 3. The positioning holes in the lock core 6 for circumferential positioning are slot holes with openings being located in the circumferential face and the axial face of the lock core respectively, the slot holes are provided with concave slanting bottoms which can cooperate with the conical faces of the pin heads of the lock pins 3 and can retract gradually along the slanting face when the lock pins quit. The lock core 6 is provided with an arc face at the end facing the lock base 2, so that the arc face can abut against the conical faces of the lock pin heads and gradually compresses the lock pins and then the lock pins can be inserted into the right position, when the lock core 6 is being inserted into the circle center hole of the lock base 2. Flanges 6c for restricting are provided at the circumference of the lock core 6, so that the lock core can be in position accurately. A pulling fork 9 is slidably matched at a pulling fork shaft 10, the pulling fork 9 is connected with a gear shifting cam 11 at the end, and driven by the gear shifting cam 11, the fork head end of the pulling fork 9 is wedged in the circular groove 6b disposed in the circumference of the lock core 6 to pull the lock core 6 which then axially moves at the auxiliary shaft 8. After the lock core 6 has moved towards lock base 2 direction, the positioning holes 6a for circumferential positioning cooperate with the lock pins 3 on the lock base 2 to form circumferential fixing, and thus the auxiliary shaft 8 cannot rotate, and through the braking of the auxiliary shaft 8 the wheels of the three/four-wheel motorbike are unable to rotate, thereby achieving stable parking locking.

The present invention is not just limited to the above embodiment, and the lock pins can also be axially provided at the lock base, and their pin heads extend out of the axial end face of the lock base and insert from the axial end face of the lock core to form circumferential fixing of the lock core. However, use of this structure of parking locking requires providing a clear gear positioning structure at the control device for gear shifting, to prevent natural cancellation of the parking locking due to the natural separation of the lock core from the lock base.

It is not necessary that the lock core is formed integrally with the gear and it can be formed as an independent lock core which is matched at the auxiliary shaft with the spline.

The parking locking device can also be provided at the main shaft or output shaft of the transmission, which can also form parking locking.

The parking locking device according to the present invention is applicable not only to a transmission disposed in a crankcase of an engine but also to a transmission in a vehicle gear-box provided out of an engine.

Technical solutions with modifications that do not depart from the principles and spirits of the technical solution of the present invention should fall within the scope of protection of the present invention.

The invention claimed is:

1. A built-in parking locking device of a vehicle, wherein the parking locking device comprises: a lock base fixed on a box body which supports a transmission rotating shaft and a lock core which is matched on the transmission rotating shaft with a spline and is adapted for axial movement when pulled by a pulling fork, and the lock base is provided with a lock pin, the lock core is provided with a positioning hole for circumferential positioning, the rotating shaft passes through a circle center hole in the lock base and is supported on the box body; after the lock core moves axially towards the lock base, the positioning hole for the circumferential positioning and the lock pin on the lock base are matched so as to form circumferential fixing, and the pulling fork is connected with a gear shifting cam.

2. The built-in parking locking device according to claim 1, wherein the lock base is provided with multiple lock pins which are provided evenly surrounding the circle center hole of the lock base, and the lock core includes multiple positioning holes for circumferential positioning which are evenly provided in the lock core opposite to the lock pins.

3. The built-in parking locking device according to claim 2, wherein the lock pins are radially provided on the lock base and extend out of a wall of the circle center hole of the lock base at one end thereof, and a space for the insertion of the lock core is reserved between the wall of the circle center hole and the rotating shaft.

4. The built-in parking locking device according to claim 3, wherein the lock pins are elastic lock pins with pin heads being provided with conical faces, and are matched in ladder holes which are provided in the lock base for assembling the lock pins with clearance therebetween, a flange of the lock core proximal to ends of the lock pins is restricted at a hole shoulder, and springs are provided in the ladder holes to abut against the ends of the lock pins so that the pin heads extend out of a wall of the circle center hole.

5. The built-in parking locking device according to claim 4, wherein the lock base is provided with a lock housing to stop the springs.

6. The built-in parking locking device according to claim 2, wherein the lock pins are elastic lock pins with pin heads being provided with conical faces, and are matched in ladder holes which are provided in the lock base for assembling the lock pins with clearance therebetween, a flange of the lock core proximal to ends of the lock pins is restricted at a hole shoulder, and springs are provided in the ladder holes to abut against the ends of the lock pins so that the pin heads extend out of a wall of the circle center hole.

7. The built-in parking locking device according to claim 6, wherein the lock base is provided with a lock housing to stop the springs.

8. The built-in parking locking device according to claim 2, wherein the positioning holes in the lock core for circumferential positioning are slot holes, and openings of the positioning holes are located in a circumferential face and an axial face of the lock core, respectively.

9. The built-in parking locking device according to claim 8, wherein the slot holes are provided with concave slanting bottoms.

10. The built-in parking locking device according to claim 2, wherein the lock core is provided with an arc face at an end facing the lock base, and a flange for restricting is provided at the circumference of the lock core.

11. The built-in parking locking device according to claim 2, wherein the lock core is provided at an axial end of a gear and forms an integral structure with the gear.

12. The built-in parking locking device according to claim 1, wherein the lock pins are elastic lock pins with pin heads being provided with conical faces, and are matched in ladder holes which are provided in the lock base for assembling the lock pins with clearance therebetween, a flange of the lock core proximal to ends of the lock pins is restricted at a hole shoulder, and springs are provided in the ladder holes to abut against the ends of the lock pins so that the pin heads extend out of a wall of the circle center hole.

13. The built-in parking locking device according to claim 12, wherein the lock base is provided with a lock housing to stop the springs.

14. The built-in parking locking device according to claim 1, wherein the lock core includes multiple positioning holes for circumferential positioning, the positioning holes in the lock core for circumferential positioning are slot holes, and openings of the positioning holes are located in a circumferential face and an axial face of the lock core, respectively.

15. The built-in parking locking device according to claim 14, wherein the slot holes are provided with concave slanting bottoms.

16. The built-in parking locking device according to claim 1, wherein the lock core is provided with an arc face at an end facing the lock base, and a flange for restricting is provided at the circumference of the lock core.

17. The built-in parking locking device according to claim 1, wherein the lock core is provided at an axial end of a gear and forms an integral structure with the gear.

* * * * *